United States Patent
Beiler et al.

(10) Patent No.: US 12,017,489 B2
(45) Date of Patent: Jun. 25, 2024

(54) TRAILER TONGUE SYSTEM

(71) Applicant: New Heights, LLC, Leola, PA (US)

(72) Inventors: Aaron Jay Beiler, Gap, PA (US); Raymond Beiler, New Holland, PA (US); Jeremiah Weaver, Narvon, PA (US); Josiah Harthcock, Lancaster, PA (US)

(73) Assignee: New Heights, LLC, Leola, PA (US)

( * ) Notice: Subject to any disclaimer, the term of this patent is extended or adjusted under 35 U.S.C. 154(b) by 6 days.

(21) Appl. No.: 17/901,283

(22) Filed: Sep. 1, 2022

(65) Prior Publication Data

US 2024/0075775 A1 Mar. 7, 2024

(51) Int. Cl.
 *B60D 1/36* (2006.01)
 *B60D 1/04* (2006.01)
 *B60D 1/46* (2006.01)
 *B62D 63/06* (2006.01)

(52) U.S. Cl.
 CPC ............... *B60D 1/36* (2013.01); *B60D 1/04* (2013.01); *B60D 1/465* (2013.01); *B62D 63/06* (2013.01)

(58) Field of Classification Search
 CPC ...... B60D 1/167; B60D 1/065; B60D 1/1675; B60D 1/465; B62D 63/06; B62D 21/20
 See application file for complete search history.

(56) References Cited

U.S. PATENT DOCUMENTS

| | | | | |
|---|---|---|---|---|
| 3,918,744 A | * | 11/1975 | Gay | B62D 53/0857 280/901 |
| 4,113,272 A | * | 9/1978 | Sebby | B60P 3/125 280/490.1 |
| 6,155,588 A | * | 12/2000 | Maxey | B60D 1/465 280/491.1 |
| 2015/0035254 A1 | * | 2/2015 | Benson | B62D 53/062 29/428 |
| 2016/0185170 A1 | * | 6/2016 | McAllister | B60D 1/248 177/136 |

FOREIGN PATENT DOCUMENTS

| | | | | |
|---|---|---|---|---|
| DE | 102005017578 A1 | * | 10/2006 | ........... A01B 59/068 |
| GB | 2462482 A | * | 2/2010 | ............. B60D 1/065 |

* cited by examiner

*Primary Examiner* — James A English
(74) *Attorney, Agent, or Firm* — Barley Snyder

(57) ABSTRACT

The trailer tongue system is provided and includes a trailer frame, an arm support assembly secured to the trailer frame, and a trailer connection arm assembly. When the trailer tongue system is ready for deployment, the hydraulic system support activates. The hydraulic system support permits the arm support assembly to pivot between first position and second position depending on whether the user would like to connect or disconnect a trailer from a power vehicle. The arm support assembly enables the trailer arm of the trailer connection arm assembly to be either raised or lowered depending on whether the user would like to connect or disconnect the trailer.

16 Claims, 8 Drawing Sheets

TRAILER TONGUE SYSTEM

FIELD OF INVENTION

The invention relates to a trailer tongue system and, more particularly, to a trailer tongue system that raises and lowers in height by an automated process in order to hook or unhook a trailer from a power vehicle.

BACKGROUND

Workers in the trucking industry often need to hook and un-hook trailers from power vehicles. In order to perform this process, a worker would need to utilize a trailer jack in order to raise the trailer to a height where the power vehicle can safely connect. Generally, this is a time-consuming task if done manually because a worker would need to manually raise or lower multiple jacks in order to connect or disconnect a trailer. It is essential to perform the process of un-hooking or hooking a trailer as quickly as possible in order to keep up with the pace of transporting goods in the trucking industry. In fact, most trailers are so heavy that it is impossible for a human to maneuver the tongue in position with respect to a trailer mount. Therefore, there is a need for a trailer tongue system that would reduce the time for a worker to either hook or un-hook a trailer from a power vehicle.

SUMMARY

In view of the aforementioned problem, a trailer tongue system according to the invention is provided, a trailer frame having a set of frame side support members connected to a frame top covering; an arm support assembly having: an upper support arm connected to the trailer frame, a lower support arm connected to both the upper support arm and a trailer arm, a hydraulic support system permitting the arm support assembly to pivot, and a trailer connection arm assembly connected to the lower support arm, wherein the trailer arm can be raised or lowered by the hydraulic support system for coupling with a trailer of a power vehicle.

BRIEF DESCRIPTION OF DRAWINGS

The present invention will now be described by way of example with references to the accompanying drawings of which.

DETAILED DESCRIPTION OF EMBODIMENT(S)

Figure 1:
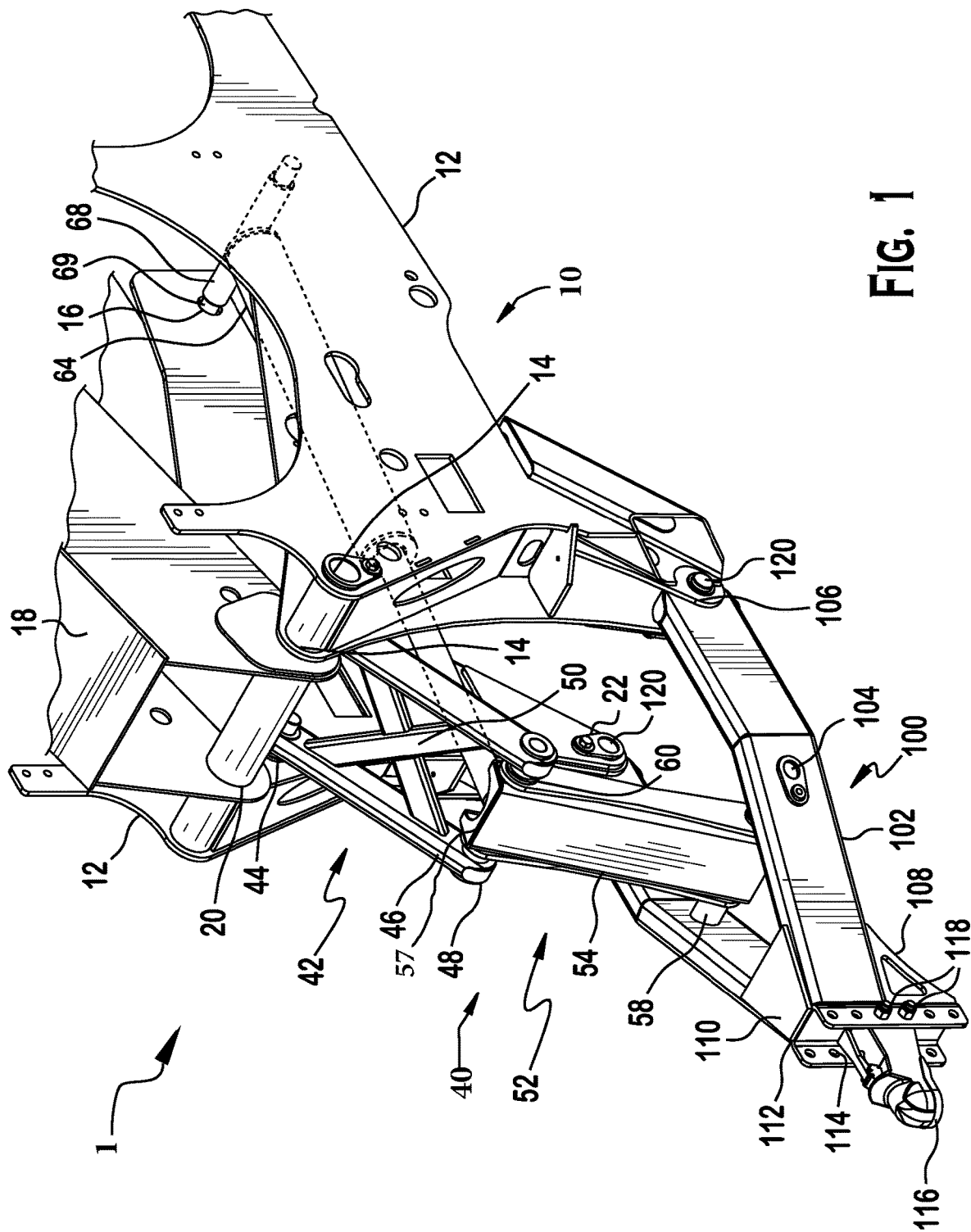
FIG. 1 is a front, left, top perspective view of a trailer tongue system in accordance with the present invention.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete, and will fully convey the concept of the invention to those skilled in the art.

With reference to FIGS. 1-8, an exemplary embodiment of a trailer tongue system 1 according to the invention, is shown and ready for deployment to assist the hooking or unhooking of a trailer coupled to a power vehicle. In an exemplary embodiment shown, the trailer tongue system 1, constructed in accordance with the present invention, generally includes the following major components: a trailer frame 10, an arm support assembly 40 secured to the trailer frame 10, and a trailer connection arm assembly 100.

In the exemplary embodiment, the trailer frame 10 generally includes the following components: a set of frame side support members 12 and a frame top covering 18. In the exemplary embodiment, the dual set of frame side support members 12 are plate like. One of ordinary skill in the art would understand the applicant's design of the frame side support members 12 is not the exclusive embodiment. In the exemplary embodiment, the frame side support members 12 include two sets of arm support assembly connectors 14. One of ordinary skill in the art would understand the applicant's design is not the exclusive embodiment. In the exemplary embodiment, the two sets of arm support assembly connectors 14 are receivers. One of ordinary skill in the art would understand the applicant's design is not the exclusive embodiment. In the exemplary embodiment, the set of frame side support members 12 further include a set of hydraulic piston support connectors 16 as shown in FIG. 1. One of ordinary skill in the art would understand the applicant's design is not the exclusive embodiment. In the exemplary embodiment, the hydraulic piston support connectors 16 are receivers. One of ordinary skill in the art would understand the applicant's design is not the exclusive embodiment.

Figure 4:
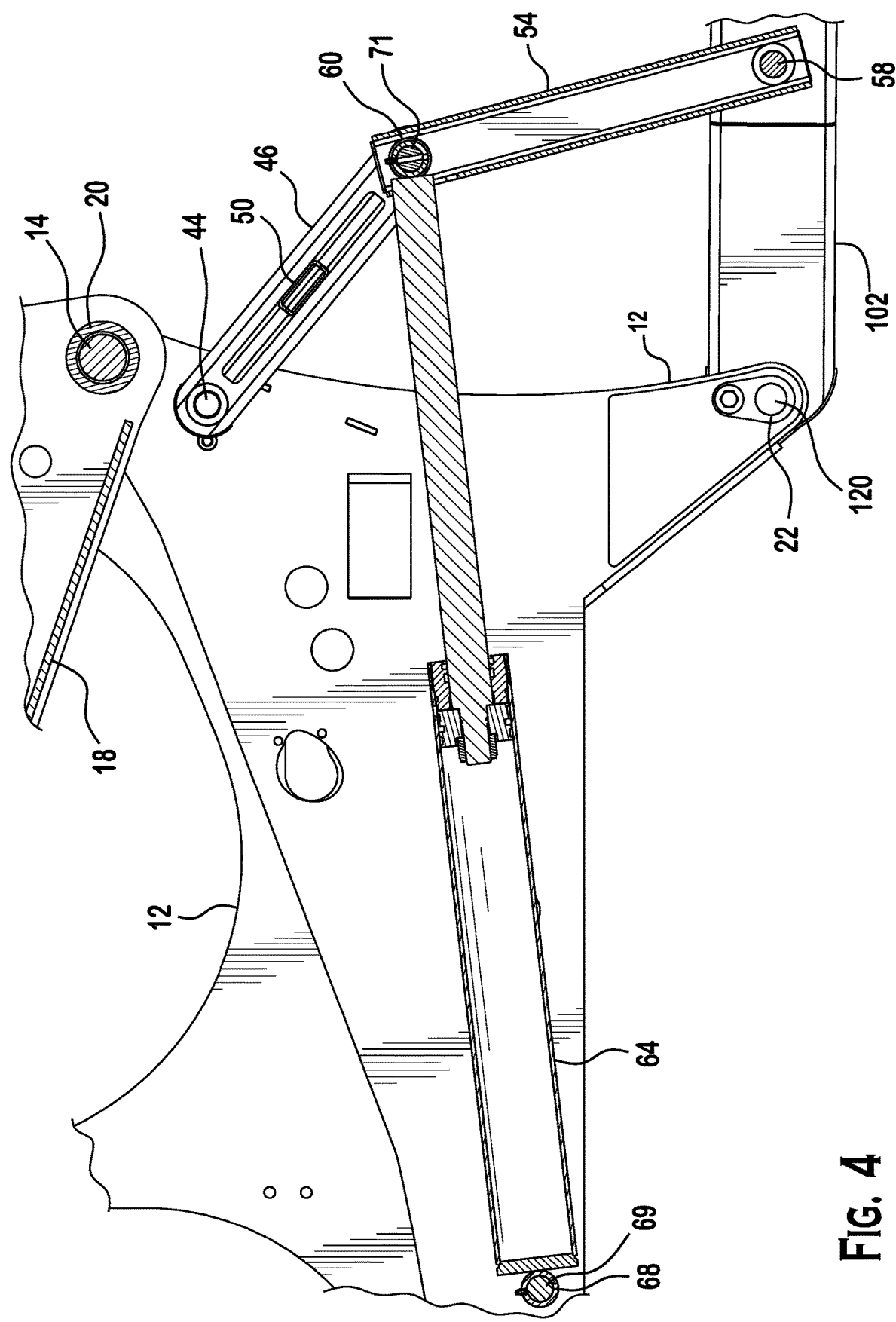
FIG. 4 is a right-side cross-sectional view of FIG. 3.

In the exemplary embodiment, the frame side support members 12 further include a set of trailer arm connector passageways 22 as shown in FIG. 4. One of ordinary skill in the art would understand the applicant's design is not the exclusive embodiment. In the exemplary embodiment, the set of frame side support members 12 further include a set of beam connectors 24. One of ordinary skill in the art would understand the applicant's design is not the exclusive embodiment. In the exemplary embodiment, the set of beam connectors 24 are receivers. One of ordinary skill in the art would understand the applicant's design is not the exclusive embodiment.

Figure 7:
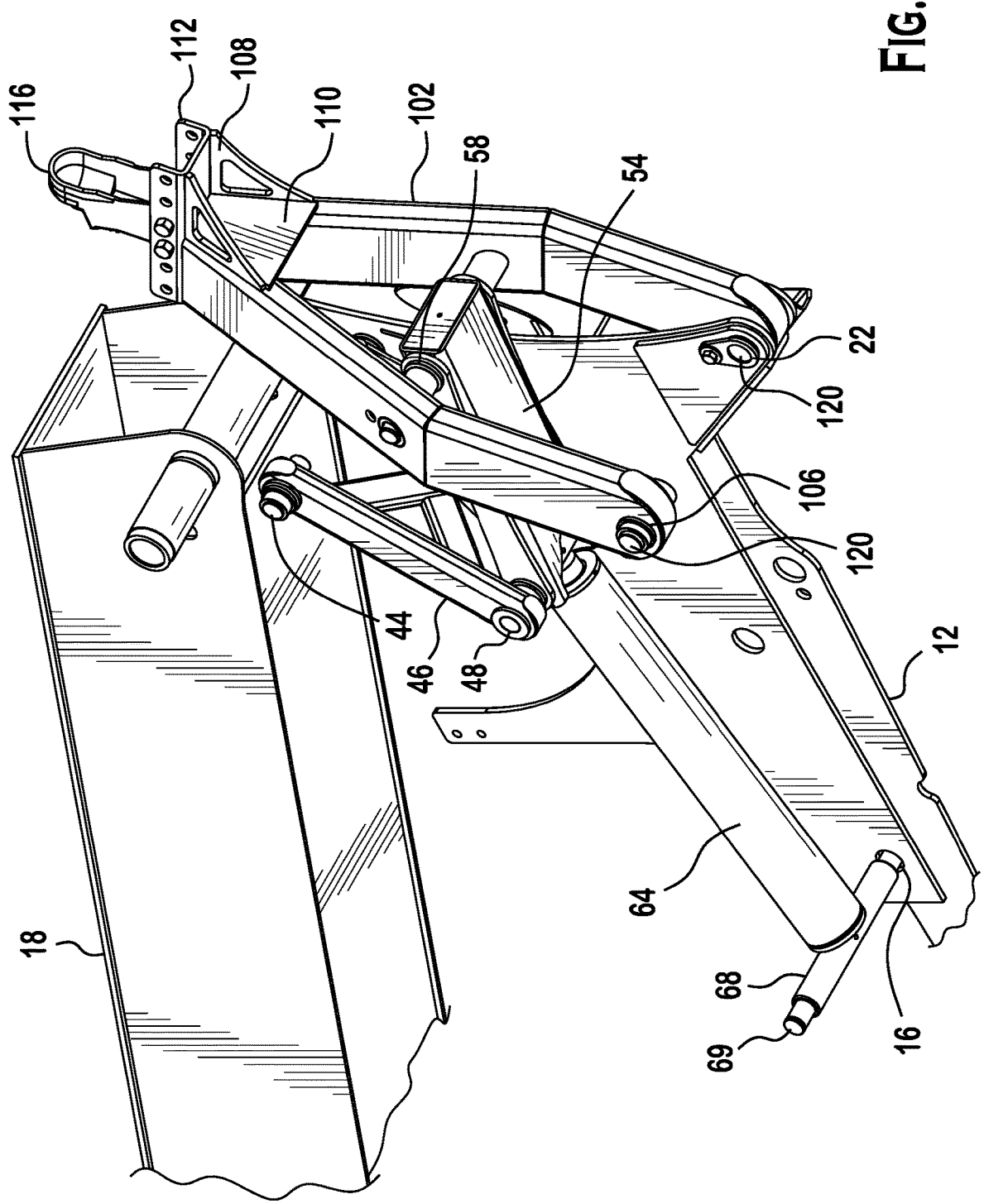
FIG. 7 is a front, right, bottom view constructed in accordance with the present invention as shown in FIG. 6.
Figure 8:
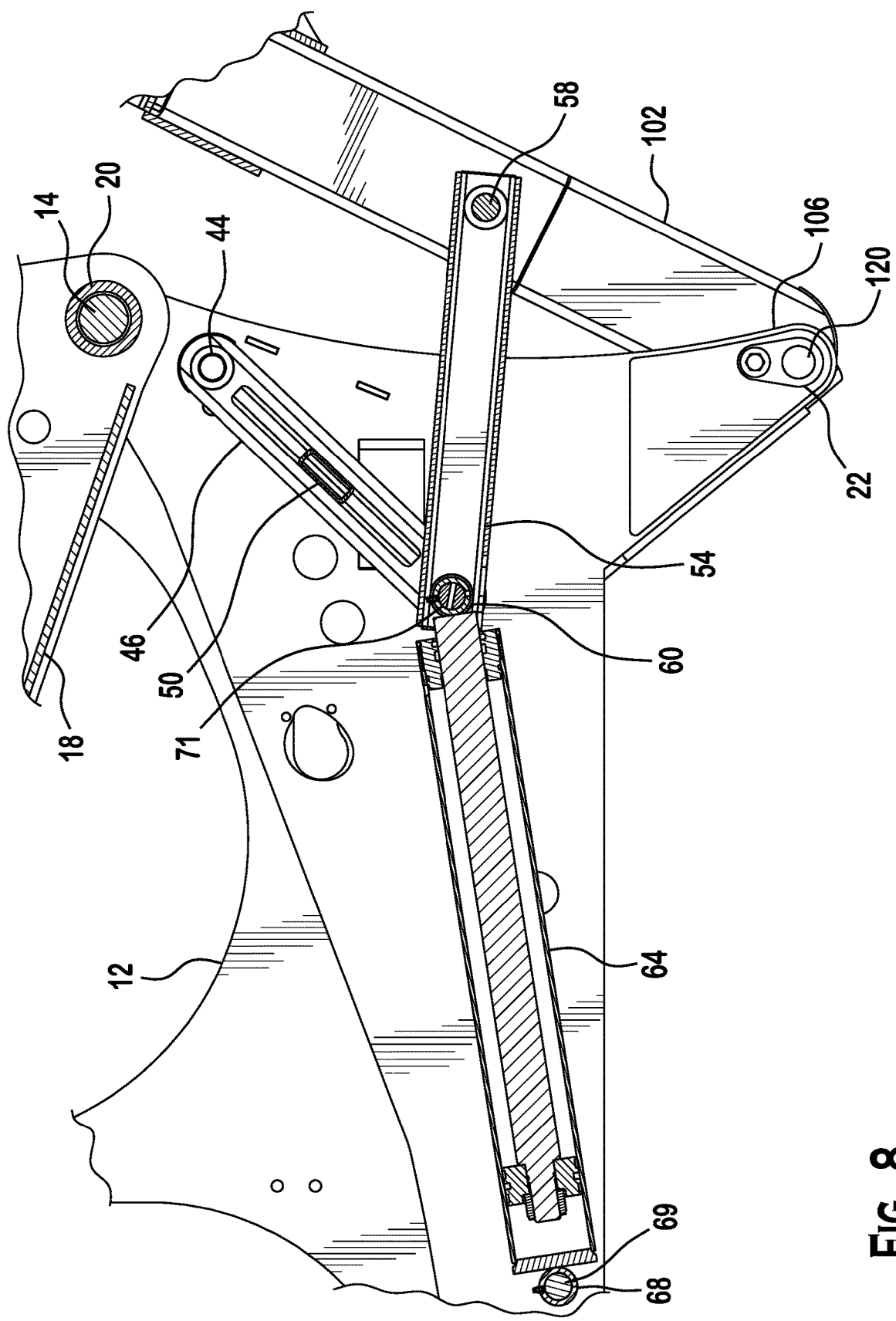
FIG. 8 is a right cross-sectional view of FIG. 7.

In the exemplary embodiment, the frame top covering 18 is a u-shaped beam as shown in FIG. 7. One of ordinary skill in the art would understand the applicant's design is not the exclusive embodiment. In the exemplary embodiment, the frame top covering 18 includes a set of frame joining connectors 20. One of ordinary skill in the art would understand the applicant's design is not the exclusive embodiment. In the exemplary embodiment, the set of frame joining connectors 20 are receivers. One of ordinary skill in the art would understand the applicant's design is not the exclusive embodiment. In the exemplary embodiment, the frame joining connectors 20 are located on the legs of the frame top covering 18 as shown in FIG. 7. One of ordinary skill in the art would understand the applicant's design is not the exclusive embodiment.

Figure 2:
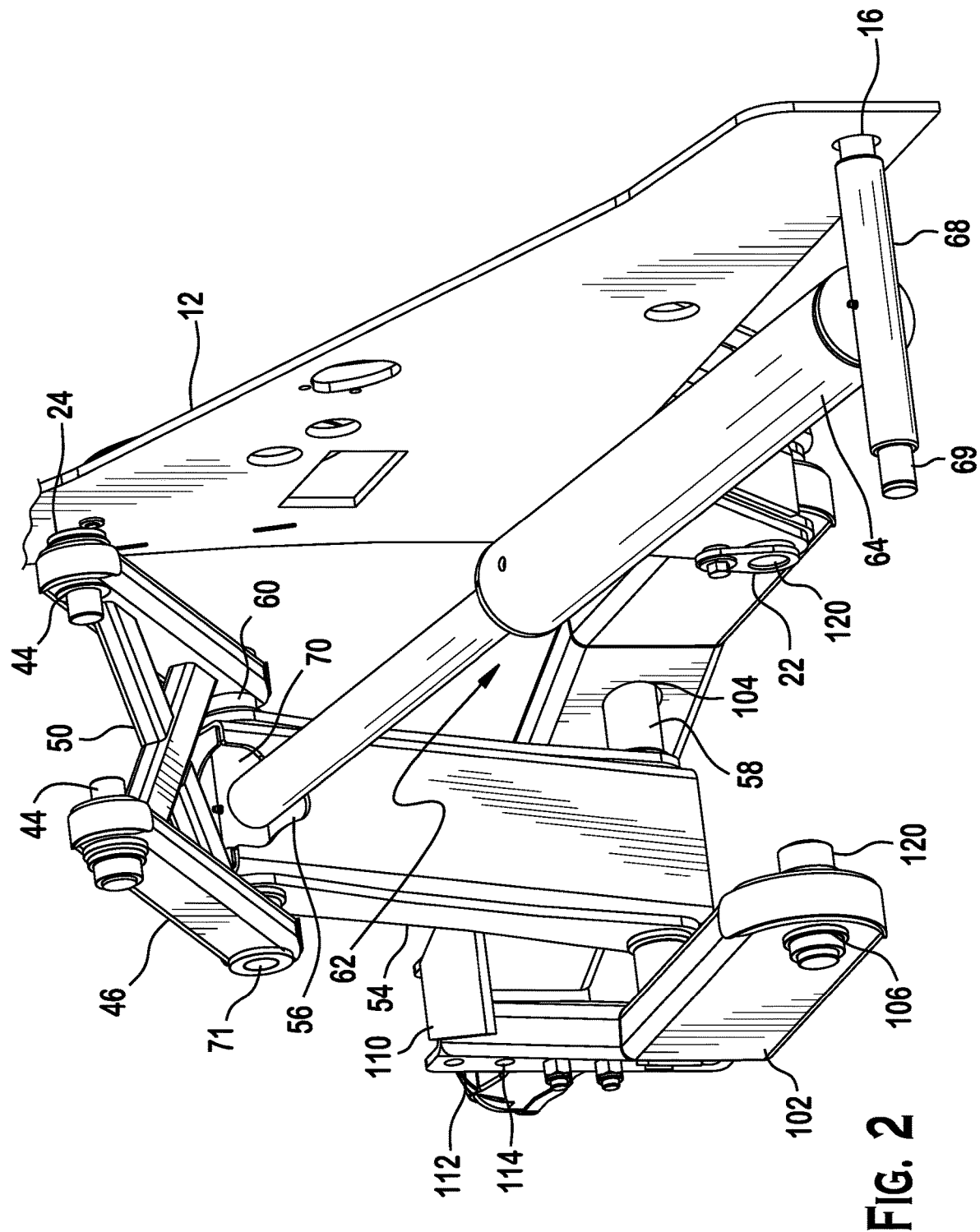
FIG. 2 is a rear, left, top view of the trailer tongue system of FIG. 1.
Figure 5:
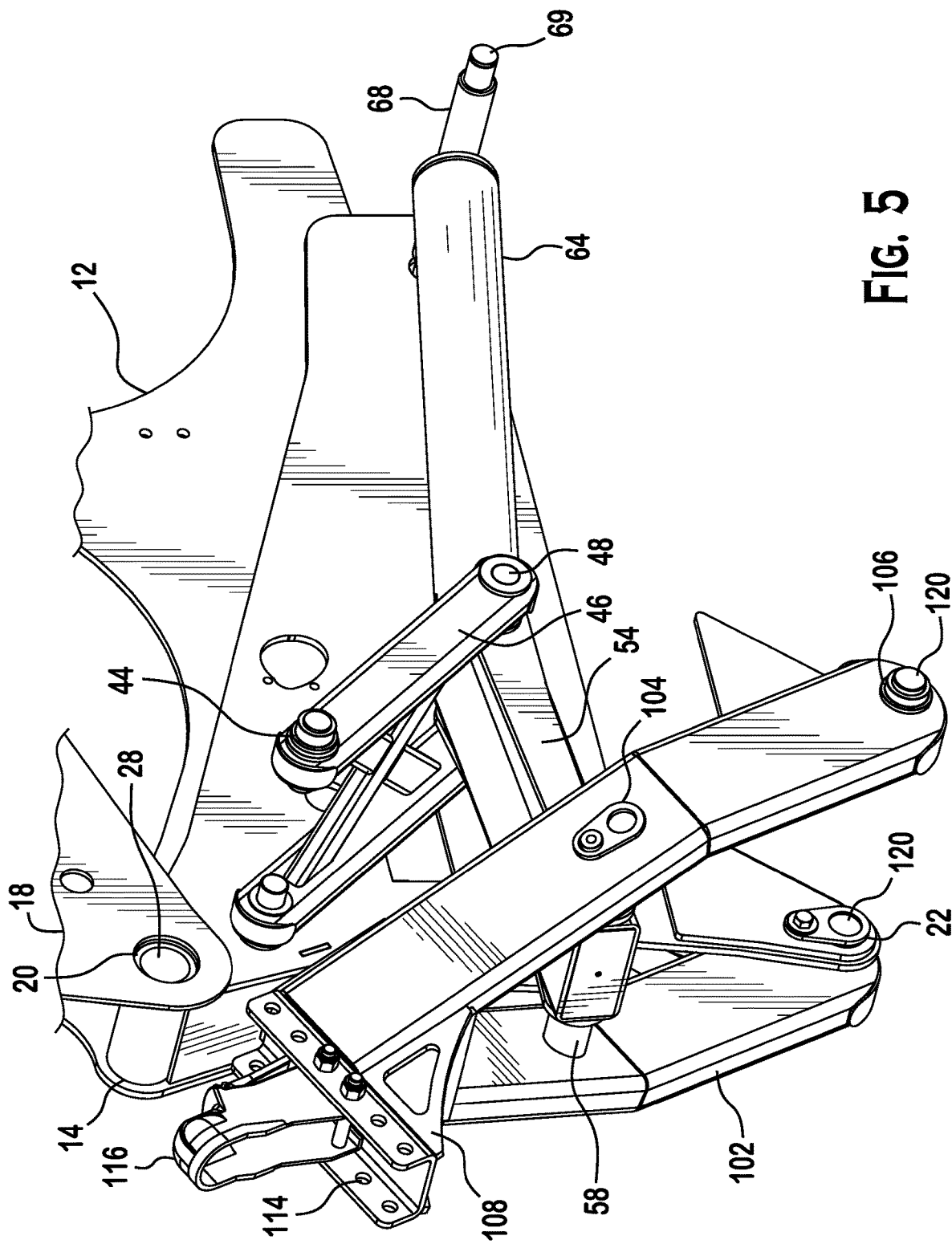
FIG. 5 is a front, left, top view of the trailer tongue system, constructed in accordance with the present invention as shown in FIG. 4.

In the exemplary embodiment, the arm support assembly 40 generally includes the following major components: an upper support arm 42, a lower support arm 52, and a hydraulic support system 62, as shown in FIGS. 1 and 2. In the exemplary embodiment, the upper support arm 42 generally includes a set of beams 46 and a support bracket 50. One of ordinary skill in the art would understand the applicant's design is not the exclusive embodiment. In the exemplary embodiment, the set of beams 46 are elongated oval shaped members. One of ordinary skill in the art would understand the applicant's design is not the exclusive embodiment. In the exemplary embodiment, the set of beams 46 include a set of frame fasteners 44. One of ordinary skill in the art would understand the applicant's design is not the exclusive embodiment. In the exemplary embodiment, the frame fasteners 44 are cylindrical pegs located at parallel points on the upper end of each of the beams 46. One of ordinary skill in the art would understand the applicant's design is not the exclusive embodiment. In the exemplary embodiment, the set of beams 46 further include a set of support arm fasteners 48 as shown in FIG. 5. One of ordinary skill in the art would understand the applicant's design is not the exclusive embodiment. In the exemplary embodiment, the support arm fasteners 48 are cylindrical pegs located at parallel points on the lower end of each of the beams 46. One of ordinary skill in the art would understand the applicant's design is not the exclusive embodiment.

Figure 6:
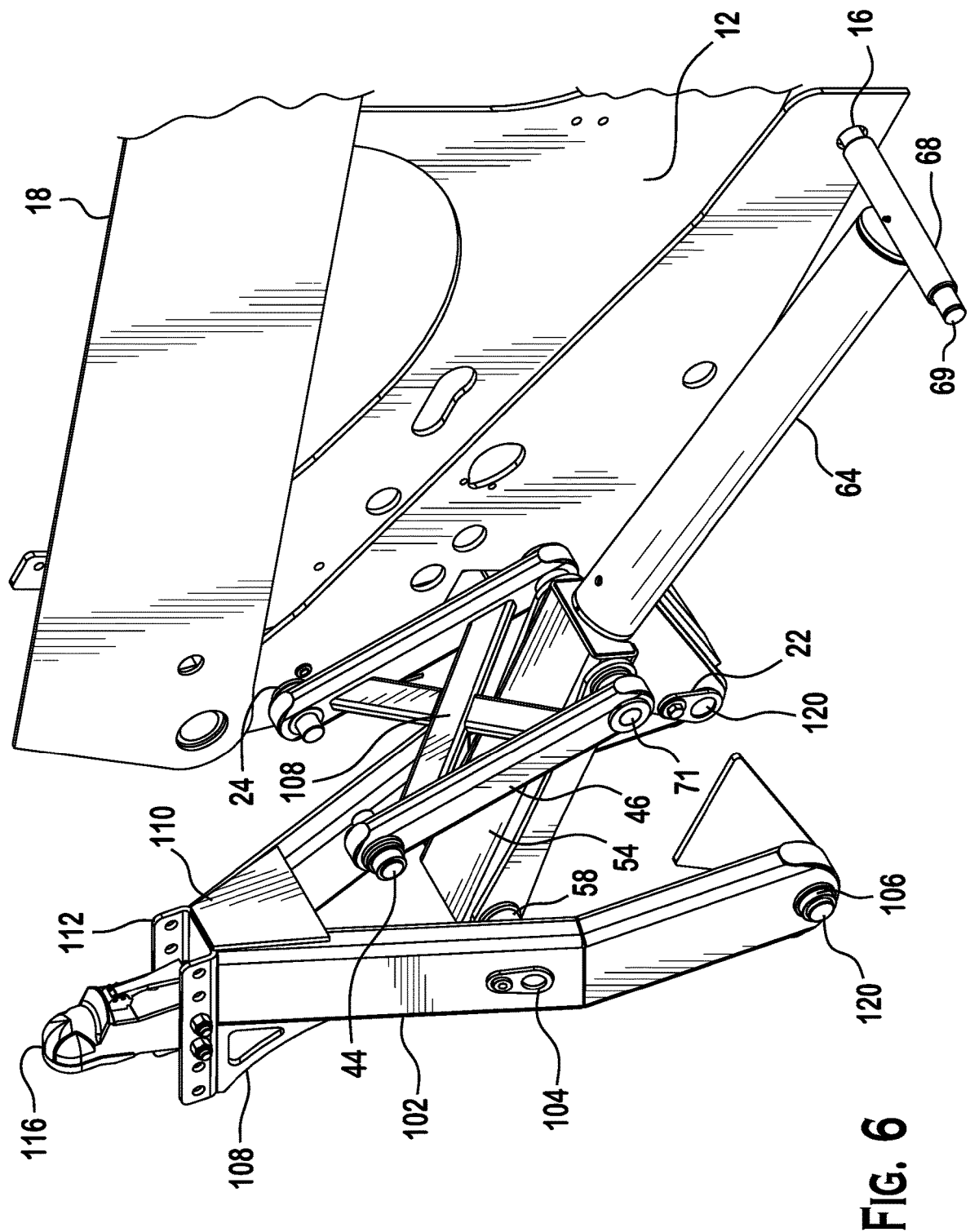
FIG. 6 is a rear, left, top view constructed in accordance with the present invention as shown in FIG. 5.

In the exemplary embodiment, the support bracket 50 is x-shaped and located between the set of beams 46 as shown in FIG. 6. One of ordinary skill in the art would understand the applicant's design of the support bracket 50 is not the exclusive embodiment.

In the exemplary embodiment, the lower support arm 52 generally includes an elongated lower support arm body 54. One of ordinary skill in the art would understand the applicant's design is not the exclusive embodiment. In the exemplary embodiment, the elongated lower support arm body 54 is a rectangular shaped hollow member. One of ordinary skill in the art would understand the applicant's design is not the exclusive embodiment. In the exemplary embodiment, the elongated lower support arm body 54 further includes a set of support arm receivers 60 as shown in FIG. 4. One of ordinary skill in the art would understand the applicant's design is not the exclusive embodiment. In the exemplary embodiment, the set of support arm receivers 60 are located in the upper region of the elongated lower support arm body 54 at parallel points as shown in FIG. 1. One of ordinary skill in the art would understand the applicant's design is not the exclusive embodiment. In the exemplary embodiment, the elongated lower support arm body 54 further includes a set of trailer arm connectors 58 as shown in FIG. 2. One of ordinary skill in the art would understand the applicant's design is not the exclusive embodiment. The trailer arm connectors 58 are cylindrical pegs located at parallel points on the lower region of the elongated lower support arm body 54. One of ordinary skill in the art would understand the applicant's design is not the exclusive embodiment.

In the exemplary embodiment, the elongated lower support arm body 54 of the lower support arm 52 further includes an hydraulic slot receiver 56 as shown in FIG. 2. One of ordinary skill in the art would understand the applicant's design is not the exclusive embodiment. In the exemplary embodiment, the hydraulic slot receiver 56 is an opening for a lower hydraulic support structure 70 of the hydraulic support system 62. One of ordinary skill in the art would understand the applicant's design is not the exclusive embodiment. In the exemplary embodiment, the hydraulic slot receiver securing flap 57 is fixed above the slot receiver 56 as shown in FIG. 1. One of ordinary skill in the art would understand the applicant's design is not the exclusive embodiment.

Figure 3:
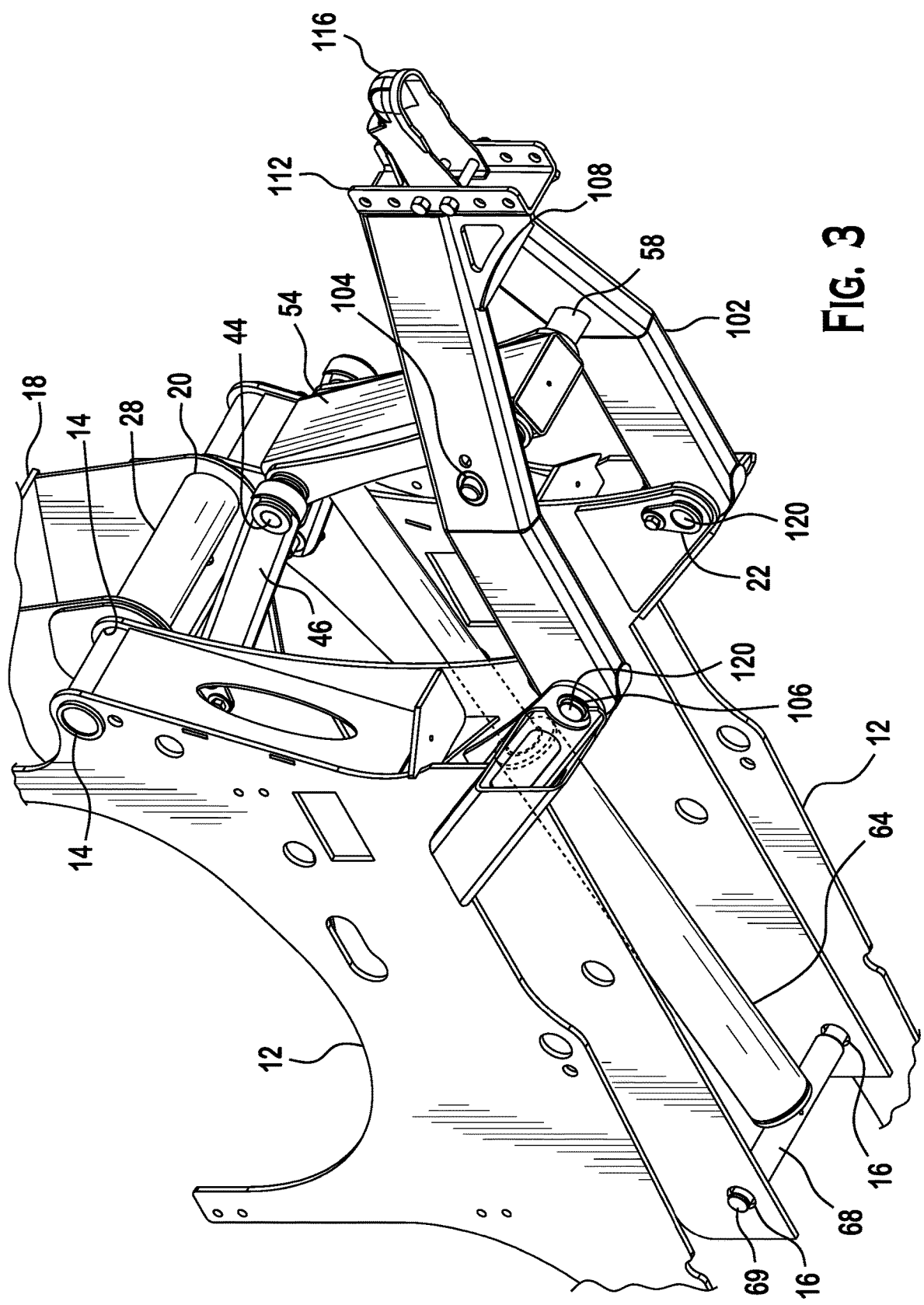
FIG. 3 is a front, right, bottom view of the trailer tongue system of FIG. 2.

In the exemplary embodiment, the hydraulic support system 62 generally includes a hydraulic piston 64, an upper hydraulic support structure 68 and the lower hydraulic support structure 70 as shown in FIG. 2. One of ordinary skill in the art would understand the applicant's design is not the exclusive embodiment. In the exemplary embodiment, the hydraulic piston 64 is a standard piston. One of ordinary skill in the art would understand the normal components of the hydraulic piston 64 and applicant's design is not the exclusive embodiment. In the exemplary embodiment, the hydraulic piston 64 is located within the trailer frame 10 as shown in FIG. 2. One of ordinary skill in the art would understand the applicant's design is not the exclusive embodiment. In the exemplary embodiment, the upper hydraulic support structure 68 is an elongated cylindrical member. One of ordinary skill in the art would understand the applicant's design is not the exclusive embodiment. In the exemplary embodiment, the upper hydraulic support structure 68 is fixed to the upper region of the hydraulic piston 64 as shown in FIG. 3. One of ordinary skill in the art would understand the applicant's design is not the exclusive embodiment. In the exemplary embodiment, the upper hydraulic support structure 68 further includes a set of insertion pieces 69 located at each end of the upper hydraulic support structure 68 to secure the upper hydraulic support structure 68 to one of the frame side support members 12. One of ordinary skill in the art would understand the applicant's design is not the exclusive embodiment. In the exemplary embodiment, the insertion pieces 69 are cylindrical pegs. One of ordinary skill in the art would understand the applicant's design is not the exclusive embodiment.

In the exemplary embodiment, the lower hydraulic support structure 70 is a hollow cylindrical rod which fixes to the lower region of the hydraulic piston 64. One of ordinary skill in the art would understand the applicant's design is not the exclusive embodiment. In the exemplary embodiment, the lower hydraulic support structure 70 further includes a receiving passageway 71 extending the length of the lower hydraulic support structure 70 in the longitudinal direction. One of ordinary skill in the art would understand the applicant's design is not the exclusive embodiment.

In the exemplary embodiment, the trailer connection arm assembly 100 generally includes the following major components: a trailer arm 102, a mounting plate 112 and a hitch receiver 116 as shown in FIG. 3. One of ordinary skill in the art would understand the applicant's design is not the exclusive embodiment. In the exemplary embodiment, the trailer arm 102 is a v-shaped elongated member as visible in FIG. 1. One of ordinary skill in the art would understand the applicant's design is not the exclusive embodiment. In the exemplary embodiment, the trailer arm 102 includes a set of middle trailer connection arm fastener receivers 104 located in the central region of the trailer arm 102. One of ordinary skill in the art would understand the applicant's design is not the exclusive embodiment.

In the exemplary embodiment, the trailer arm 102 further includes a set of upper trailer connection arm fastener receivers 106 as shown in FIG. 5. One of ordinary skill in the art would understand the applicant's design is not the exclusive embodiment. In the exemplary embodiment, the set of upper trailer connection arm fastener receivers 106 are located at upper ends of the trailer arm 102 towards the trailer frame 10 as shown in FIG. 3. One of ordinary skill in the art would understand the applicant's design is not the exclusive embodiment. In the exemplary embodiment, the trailer arm 102 further includes a trailer arm bracket 108 as shown in FIG. 3. The trailer arm bracket 108 is a triangular shaped member. One of ordinary skill in the art would understand the applicant's design is not the exclusive embodiment. In the exemplary embodiment, the trailer arm bracket 108 is located on the bottom portion of the trailer arm 102, opposite a protector flap 110 as shown in FIG. 6. One of ordinary skill in the art would understand the applicant's design is not the exclusive embodiment.

In the exemplary embodiment, the trailer arm 102 further includes the protector flap 110. One of ordinary skill in the art would understand the applicant's design is not the exclusive embodiment. In the exemplary embodiment, the protector flap 110 is a plate-like trapezoidal member as shown in FIG. 1. One of ordinary skill in the art would understand the applicant's design is not the exclusive embodiment. In the exemplary embodiment, the protector flap 110 is located on the top portion of the trailer arm 102, opposite the trailer arm bracket 108. One of ordinary skill in the art would understand the applicant's design is not the exclusive embodiment.

In the exemplary embodiment, the mounting plate 112 is a u-shaped elongated member. One of ordinary skill in the art would understand the applicant's design is not the exclusive embodiment. In the exemplary embodiment, the mounting plate 112 further includes a plurality of fastener receiving passages 114 as shown in FIG. 5. One of ordinary skill in the art would understand the applicant's design is not the exclusive embodiment. In the exemplary embodiment, the plurality of fastener receiving passages 114 are threaded and located on the legs of the mounting plate 112. One of ordinary skill in the art would understand the applicant's design is not the exclusive embodiment.

In the exemplary embodiment, the hitch receiver 116 is a standard hitch receiver. One of ordinary skill in the art would understand the components of a hitch receiver 116 and the applicant's design is not the exclusive embodiment.

In the exemplary embodiment, the trailer tongue system 1 is generally constructed of the following major components: a trailer frame 10, an arm support assembly 40 secured to the frame, and a trailer connection arm assembly 100.

In the exemplary embodiment, the hitch receiver 116 of the trailer connection arm assembly 100 is fastened to the mounting plate 112 by fasteners 118 being inserted into the plurality of fastener receiving passages 114 as shown in FIG. 1. One of ordinary skill in the art would understand the applicant's design is not the exclusive embodiment. In the exemplary embodiment, the mounting plate 112 of the trailer connection arm assembly 100 is secured to the front face of the trailer arm 102 and one edge of the trailer arm bracket 108 as shown in FIG. 3. One of ordinary skill in the art would understand the applicant's design is not the exclusive embodiment. Moreover, the trailer arm bracket 108 is fixed to both the back face of the mounting plate 112 and the bottom face of the trailer arm 102 as shown in FIG. 3. One of ordinary skill in the art would understand the applicant's design is not the exclusive embodiment. In the exemplary embodiment, the protector flap 110 is attached to the top face of the trailer arm 102, near the mounting plate 112 as shown in FIG. 6. One of ordinary skill in the art would understand the applicant's design is not the exclusive embodiment.

In the exemplary embodiment, the trailer arm 102 is attached to the frame side support members 12 by aligning the trailer arm connector passageways 22 and the upper trailer connection arm fastener receivers 106. Further, inserting a fastener 120 there through for a secure connection as shown in FIG. 6. One of ordinary skill in the art would understand the applicant's design is not the exclusive embodiment. In the exemplary embodiment, the elongated lower support arm body 54 of the lower support arm 52 is attached to the trailer arm 102 by inserting the trailer arm connectors 58 into the middle trailer connection arm fastener receivers 104 as shown in FIG. 2. One of ordinary skill in the art would understand the applicant's design is not the exclusive embodiment.

In the exemplary, the elongated lower support arm body 54 is attached to the upper support arm 42 by inserting the support arm fasteners 48 into the support arm receivers 60 as shown in FIG. 7. One of ordinary skill in the art would understand the applicant's design is not the exclusive embodiment. In the exemplary embodiment, the support bracket 50 of the upper support arm 42 is fixed to the set of beams 46 at four end points of the support bracket 50 as shown in FIG. 1. One of ordinary skill in the art would understand the applicant's design is not the exclusive embodiment. Further, one of ordinary skill in the art would understand there is more than one way to attach the support bracket 50 to the set of beams 46. In the exemplary embodiment, the set of beams 46 are connected to the frame side support members 12 by inserting the frame fasteners 44 of the set of beams 46 into the set of beam connectors 24 as shown in FIG. 6. One of ordinary skill in the art would understand the applicant's design is not the exclusive embodiment.

In the exemplary embodiment, the hydraulic piston 64 of the hydraulic support system 62 is connected to the lower support arm 52 by inserting the lower hydraulic support structure 70 inside the hydraulic slot receiver 56 of the lower support arm 52 as shown in FIG. 2. One of ordinary skill in the art would understand the applicant's design is not the exclusive embodiment. In an alternative view, the hydraulic piston 64 of the hydraulic support system 62 is connected to the lower support arm 52 by fixing the lower hydraulic support structure 70 directly to the head of the elongated lower support arm body 54 as shown in FIG. 6. In the exemplary embodiment, the hydraulic piston 64 of the hydraulic support system 62 is connected to the trailer frame 10 by inserting the insertion pieces 69 of the upper hydraulic support structure 68 into the hydraulic piston support connectors 16 of the frame side support members 12 as shown in FIG. 6. One of ordinary skill in the art would understand the applicant's design is not the exclusive embodiment.

In the exemplary embodiment, the frame top covering 18 is connected to the frame side support members 12 by inserting a fastener 28 through both sets of arm support assembly connectors 14 of the trailer frame 10, and the set of frame joining connectors 20 of the frame top covering 18 as shown in FIG. 5.

In the exemplary embodiment, in order for the trailer tongue system 1 to be engaged, the hydraulic support system 62 must be activated. One of ordinary skill in the art would understand the applicant's design is not the exclusive embodiment. In the exemplary embodiment, in a first position, when using the trailer tongue system 1 to hook-up a trailer to a power vehicle, the arm support assembly 40 is pivoted outward while the hydraulic piston 64 is in an extended position as shown in FIG. 2. One of ordinary skill in the art would understand the applicant's design is not the exclusive embodiment. In the exemplary embodiment, the upper support arm 42 is rotated clockwise along the axis of the trailer frame 10 while the trailer connection arm assembly 100 is rotated counterclockwise along the axis of the trailer frame 10 in order to couple the hitch receiver 116 with the hook-up connector of the desired trailer. In the exemplary embodiment, in a second position, when using the trailer tongue system 1 to un-hook a trailer, the arm support assembly 40 is pivoted inward while the hydraulic piston 64 is in the retracted position as shown in FIG. 6. The upper support arm 42 is rotated counterclockwise along the axis of the trailer frame 10 while the trailer connection arm assembly 100 is rotated clockwise along the axis of the trailer frame 10 in order to raise the trailer arm 102 and release the hitch receiver 116 from the hook-up connector of the trailer. One of ordinary skill in the art would understand the applicant's design is not the exclusive embodiment.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrated the preferred embodiment of the invention; however, concepts, as based upon the description, may be employed in other embodiments without departing from the scope of the invention.

What is claimed is:

1. A trailer tongue system, comprising:
   a trailer frame having a set of frame side support members connected to a frame top covering, the set of frame side support members are plate like and includes two sets of arm support assembly connectors, a set of hydraulic piston support connectors, and a set of trailer arm connectors;
   an arm support assembly having:
      an upper support arm connected to the trailer frame;
      a lower support arm connected to both the upper support arm;
      a hydraulic support system permitting the arm support assembly to pivot; and
   a trailer connection arm assembly connected to the lower support arm and a trailer arm that can be raised or lowered by the hydraulic support system for coupling with a trailer of a power vehicle.

2. The trailer tongue system of claim 1, wherein the set of frame side support members further include a set of beam connectors.

3. The trailer tongue system of claim 2, wherein the frame top covering is a u-shaped beam.

4. The trailer tongue system of claim 3, wherein the frame top covering includes a set of frame joining connectors located on a set of legs of the frame top covering.

5. The trailer tongue system of claim 4, wherein the upper support arm includes a set of beams and a support bracket.

6. The trailer tongue system of claim 5, wherein the set of beams include a set of frame fasteners and a set of support arm fasteners.

7. The trailer tongue system of claim 6, wherein the support bracket is x-shaped and located between the set of beams.

8. The trailer tongue system of claim 7, wherein the lower support arm includes an elongated lower support arm body.

9. The trailer tongue system of claim 8, wherein the elongated lower support arm body further includes a set of support arm receivers, and a hydraulic slot receiver.

10. The trailer tongue system of claim 9, wherein the hydraulic support system includes a hydraulic piston, an upper hydraulic support structure and a lower hydraulic support structure.

11. The trailer tongue system of claim 10, wherein the hydraulic piston is located within the trailer frame.

12. The trailer tongue system of claim 11, wherein the trailer connection arm assembly includes a mounting plate and a hitch receiver.

13. The trailer tongue system of claim 12, wherein in a first position when using the trailer tongue system to hook-up the trailer to the power vehicle, the arm support assembly is pivoted in an outward direction while the hydraulic piston is in an extended position.

14. The trailer tongue system of claim 13, wherein the upper support arm is rotated in a clockwise position along an axis of the trailer frame while the trailer connection arm assembly is rotated in a counterclockwise position along the axis of the trailer frame in order to couple the hitch receiver with a hook-up connector of the trailer.

15. The trailer tongue system of claim 14, wherein in a second position, when using the trailer tongue system to un-hook the trailer, the arm support assembly is pivoted in an inward direction while the hydraulic piston is in a retracted position.

16. The trailer tongue system of claim 15, wherein the upper support arm is rotated in the counterclockwise position along the axis of the trailer frame while the trailer connection arm assembly is rotated in the clockwise position along the axis of the trailer frame in order to raise the trailer arm and release the hitch receiver the from the hook-up connector of the trailer.

* * * * *